(12) United States Patent
Liu et al.

(10) Patent No.: US 6,342,852 B1
(45) Date of Patent: Jan. 29, 2002

(54) RADAR VIDEO DISPLAY AND RECORDING DEVICE

(75) Inventors: Guang-Sheen Liu, Tao-Yuan Hsien; Chih-Ming Liao, Kaohsiung; Hon-Chi Fon, Taipei, all of (TW)

(73) Assignee: Chang Shan Institute of Science and Technology, Tao-Yaun (TW)

( * ) Notice: Subject to any disclaimer, the term of this patent is extended or adjusted under 35 U.S.C. 154(b) by 29 days.

(21) Appl. No.: 09/583,991

(22) Filed: May 30, 2000

(51) Int. Cl.7 .............................................. G01S 7/298
(52) U.S. Cl. ........................ 342/176; 342/185; 342/190
(58) Field of Search .................................. 342/176, 185, 342/195, 190; 348/442

(56) References Cited

U.S. PATENT DOCUMENTS 6,043,775 A * 3/2000 Erickson et al. ............ 342/185
6,087,982 A * 7/2000 Liu ............................ 342/185

* cited by examiner

Primary Examiner—Daniel T. Pihulic
(74) Attorney, Agent, or Firm—W. Wayne Liauh

(57) ABSTRACT

The present invention relates to a radar video display and recording device, which can simultaneously display radar video signals of the whole and designated areas in the polar coordinates and Cartesian coordinates, respectively, and can store the radar video signals of the designated area in a hard disk drive (HDD) for obtaining long-time continuous radar video information for subsequent analysis and algorithm verification. A radar video capture card is utilized on a personal computer (PC) or workstation platform to analyze and store radar video signals of the whole and designated areas and to simultaneously display video signals at different processing stages in a digital video processing unit on a scope for monitoring the work condition at each processing stage.

14 Claims, 7 Drawing Sheets

RADAR VIDEO DISPLAY AND RECORDING DEVICE

BACKGROUND OF THE INVENTION

1. Field of Invention

The present invention relates to radar video display and recording devices and, more specifically, to a radar video display and recording device that utilizes a radar video capture card on a personal computer platform to simultaneously display the whole and designated areas in the polar coordinates and Cartesian coordinates, respectively.

2. Related Art

Referring to FIG. 1, which shows a conventional radar system block diagram. The system includes a pulse generator 11, a modulator 12, a receiver 13, a video signal processor 14, a transmitter 15, a duplexer 16, an antenna 17, and a scope 18.

First, the pulse generator 11 produces and transmits a trigger signal T to the modulator 12, the receiver 13, and the video signal processor 14. After receiving the trigger signal T the modulator 12 converts it into a pulse P and sends it to the transmitter 15 for transmission. The duplexer 16 couples a microwave signal M transmitted by the transmitter 15 to the antenna 17 and couples a radar return echo E received by the antenna 17 to the receiver 13. The receiver 13 converts the radar return echo E into an original video signal V. The video signal processor 14 then performs preprocessing on the original video signal V to eliminate noises and clutters contained therein and to convert analog original video signal V into a digital video signal D. Finally, the scope 18 makes the digital video signal D into a visible image.

In particular, the scope 18 has many ways of displaying. The most common one is the P-scope, or plan position indicator (PPI) as shown in FIG. 2. A rotational beam B is provided on the scope 18 and synchronously rotates with the antenna 17. When the radar return echo E is received by the antenna 17, it is then converted into the digital video signal D according to the above method and displayed on the scope 18 in the form of a bright spot S to show the relative position of the detected object. For radar examination equipment and some special radar devices, they often need another style of display, namely, the B-scope as shown in FIG. 3. The horizontal and vertical axes in the drawing represent the azimuthal angle and range, respectively.

However, the P-scope only displays single channel radar videos in the polar format. This display style has overlapped bright spots S for objects within a short distance adjacent to the transmission direction, which results in influential effects on the originality of the digital video signal D. Although the B-scope displays images in the rectangular format so that bright spots S adjacent to the transmission direction would not overlap and the image originality can be kept in the digital video signals, they are still single channel ones. Furthermore, the displayed range is so small that the whole area can not be shown.

Besides, when the video signal processor 14 performs preprocessing on the original video signal V to eliminate noises and clutters contained therein, the choice and design of algorithms depend upon the noise and clutter distributions. They are not only different by times and places, but receive more significant influences from weather changes. Therefore, subsequent signal analysis and algorithm verification are necessary. Nevertheless, the conventional P-scope or B-scope only displays single channel radar video signals and cannot simultaneously show the radar video signals of the whole and designated areas, the function provided thereby is so simple that subsequent signal analysis and algorithm verification become more tedious and time-consuming.

Currently, there are many patents or products in the United States of America that aim at solving the above problems. For example, the U.S. Pat. No. 3,634,887 and Pat. No. 3,840,874 proposed one type of recording and displaying device for radar video signals that can mix and store the digital video signals D and trigger signals T in a video tape for subsequent signal analysis and algorithm verification. The radar storage conversion system invented by Folsom Research, Inc. can provide both P-scope and B-scope display formats at the same time. It can also convert the digital video signals D of the two display formats into the RS-170A format and store them in a video tape for subsequent signal analysis and algorithm verification. With reference to FIG. 4, the U.S. Pat. No. 4,729,029 proposed a method for magnifying an inset on the scope 18 and displaying the magnified image on the same scope by providing an overlapped window W.

SUMMARY OF THE INVENTION

In spite the fact that the U.S. patents and products mentioned hereinbefore make some improvements in the problems that current P-scopes or B-scopes can only display signal channel radar videos and are unable to simultaneously display the radar video signals of the whole and designated areas, the methods proposed by the U.S. Pat. Nos. 3,634,887 and 3,840,874 would have distortion on the stored digital video signals D and trigger signals T due to the narrow frequency band of the video tapes. The method proposed by the U.S. Pat. No. 4,729,029 can simultaneously display radar video signals of the whole area and designated inset I magnified, but the magnified digital video signals D are displayed in the polar format. As mentioned above, this display style has overlapped bright spots S for objects within a short distance adjacent to the transmission direction, which damages the originality of the digital video signal D.

In view of the foregoing, it is a primary object of the present invention to provide a radar video display and recording device which can simultaneously display radar video signals of the whole and arbitrarily designated areas and store the signals of designated areas into a recording media (such as a hard disk drive) so as to obtain a long-time continuous radar video information of the designated areas for subsequent analysis and algorithm verification. In addition, the present invention can simultaneously display radar video signals at different processing stages in the video signal processor on a scope for the convenience of observing the work condition at each signal processing stage. Since two windows are utilized to display the radar video signals of the whole area and the designated area on a scope, and they are displayed in the polar and rectangular formats, respectively, the present invention can simultaneously solve the problems of displaying radar video signals of the whole and designated areas and of keeping the originality of radar video signals that cannot be done at the same time using the prior art.

To achieve the above goal, the present invention utilizes a radar video capture unit to analyze and store radar video signals of the whole and designated areas and to have the video signals at different processing stages in the digital video processing unit displayed on one scope for observing the work condition at each processing stage.

BRIEF DESCRIPTION OF THE DRAWINGS

The invention is described in greater detail hereinafter relative to non-limitative embodiments and the attached drawings, wherein there is shown.

DETAILED DESCRIPTION OF THE INVENTION

Figure 1:
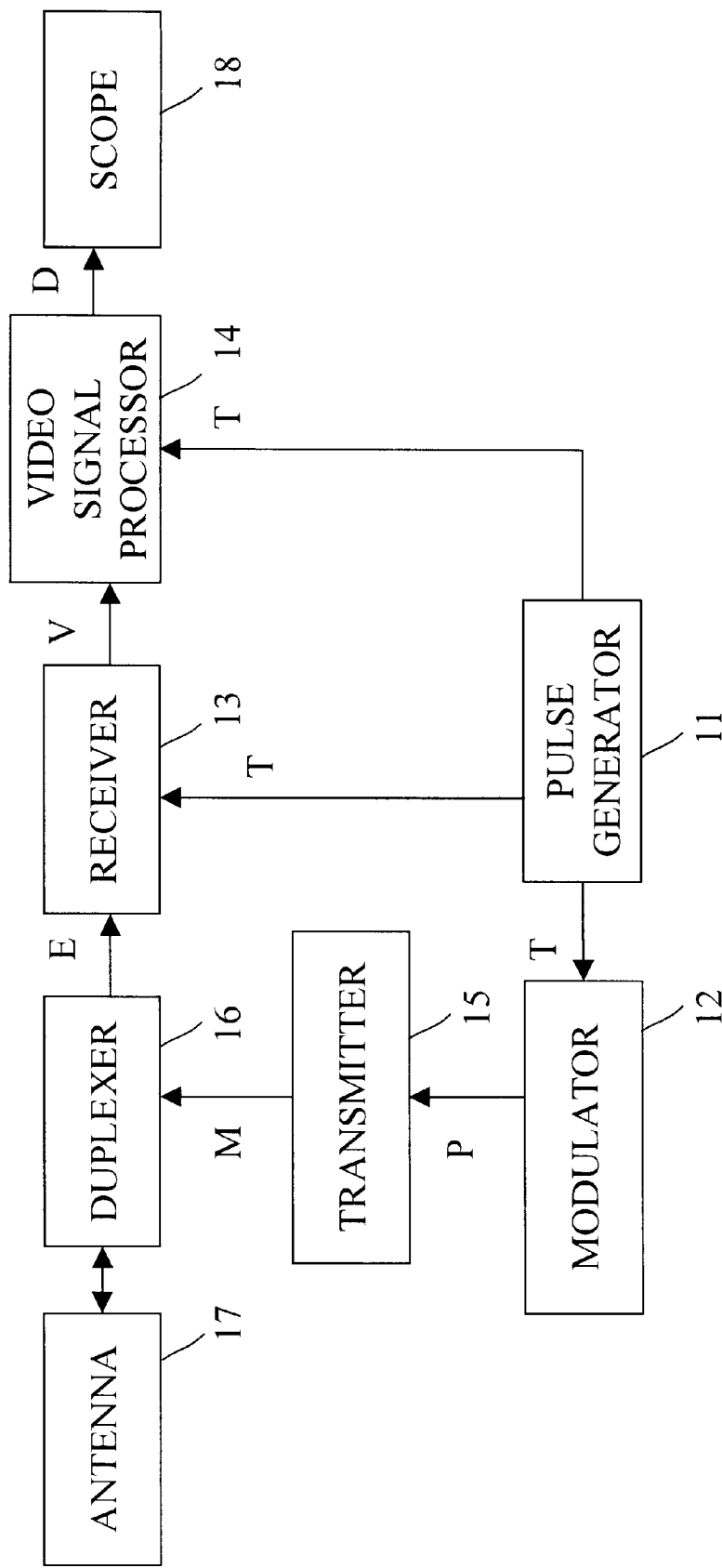
FIG. 1 is a system block diagram of a conventional radar.
Figure 2:
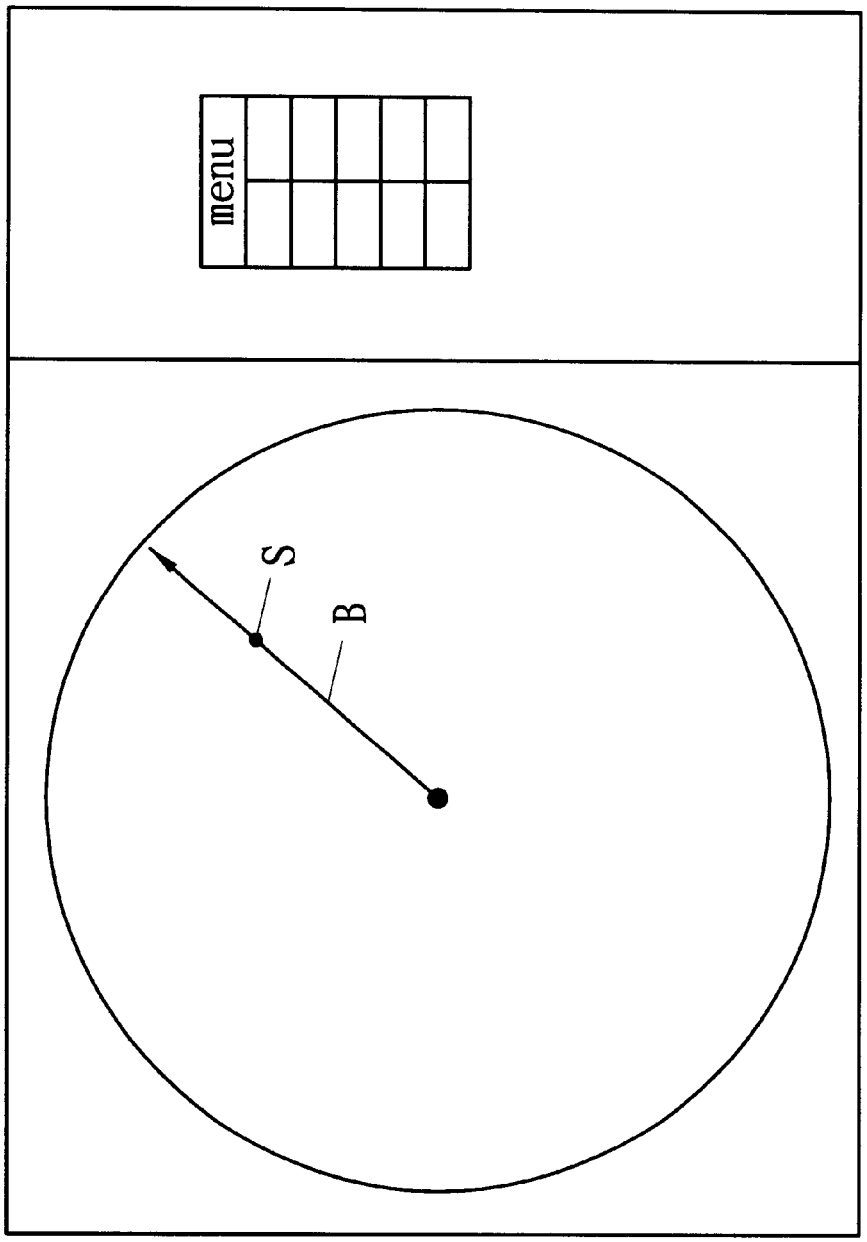
FIG. 2 is a schematic drawing of a conventional P-scope.
Figure 3:
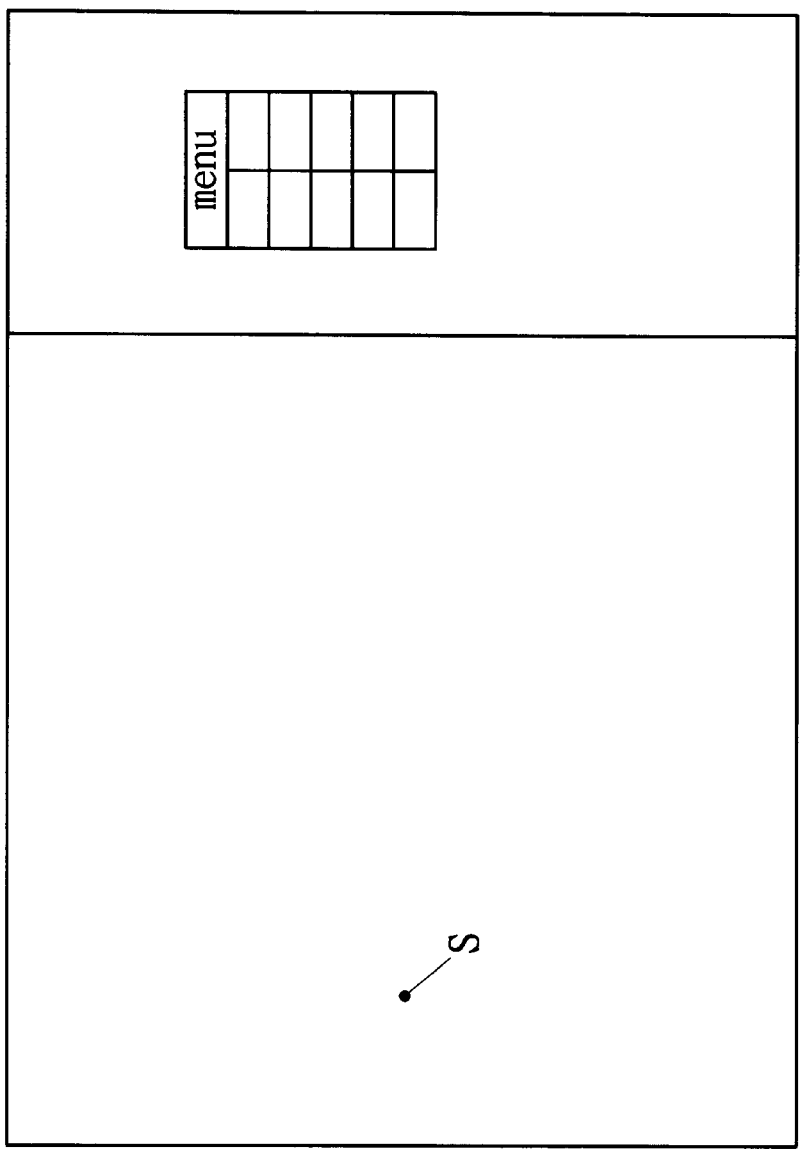
FIG. 3 is a schematic drawing of a conventional B-scope.
Figure 4:
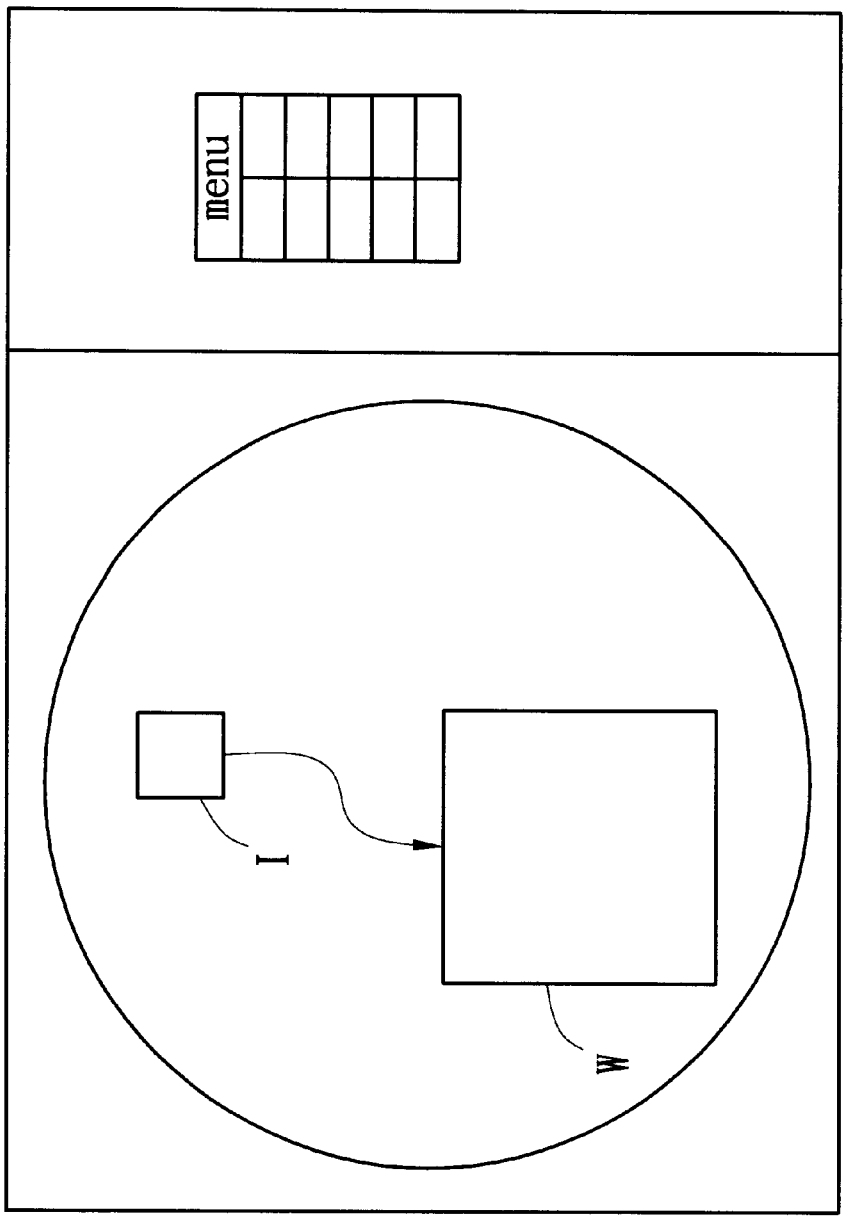
FIG. 4 is a schematic drawing of the scope in the U.S. Pat. No. 4,729,029.
Figure 5:
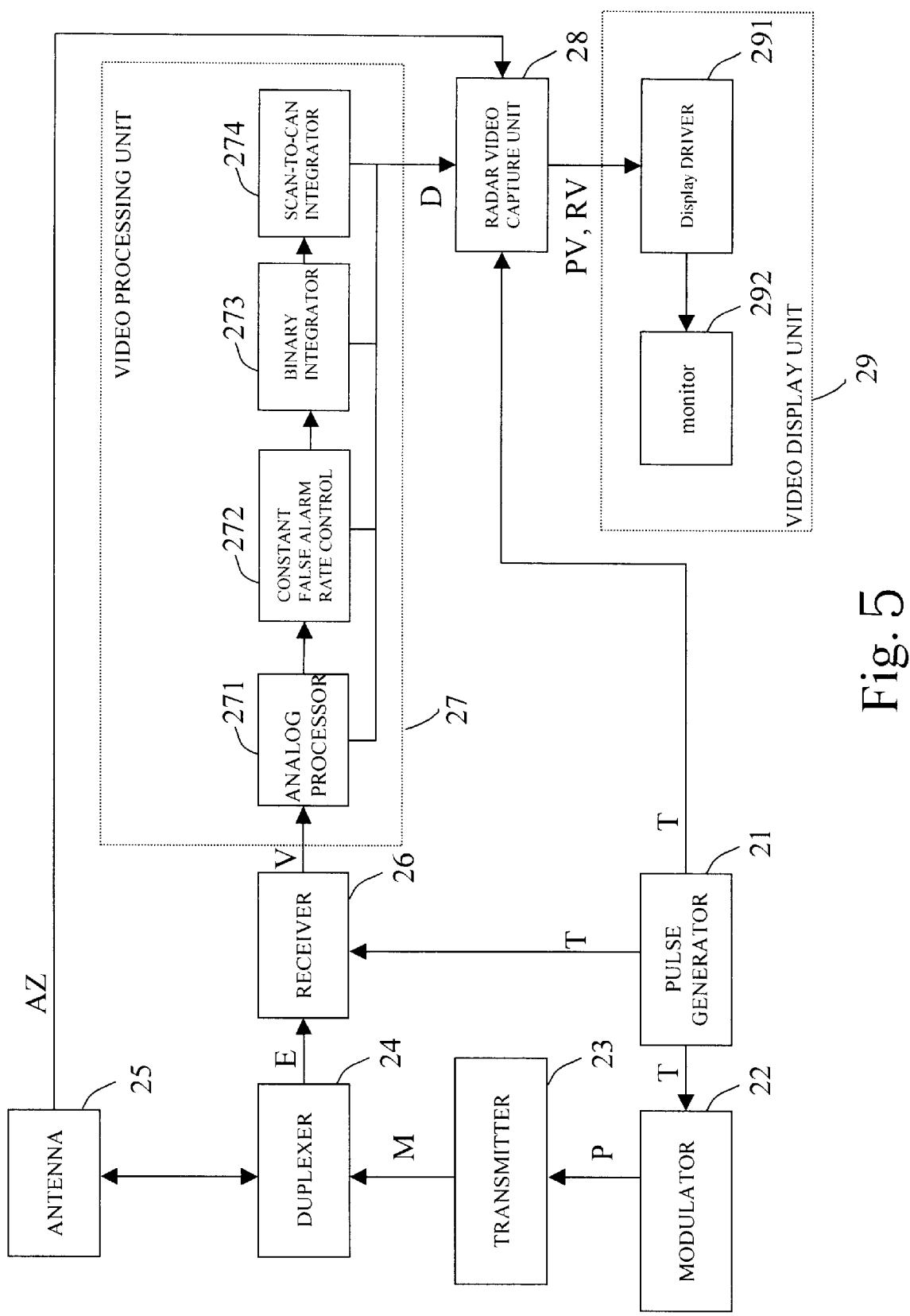
FIG. 5 is a schematic view of the application of the radar video display and recording device according to the present invention.

With reference to FIG. 5, the radar video display and recording device of the present invention takes a personal computer or workstation platform. It comprises a radar video capture unit 28 and a video display unit 29. First, a pulse generator 21 produces and sends out a trigger signal T to a modulator 22, a receiver 26, and a radar video capture unit 28. After receiving the trigger signal T, the modulator 22 converts it into a pulse P and sends it to a transmitter 23. Then a microwave direction control 24, which can be a duplexer, couples a microwave signal M transmitted by the transmitter 23 to an antenna 25 and couples a radar return echo E received by the antenna 25 to the receiver 26. The receiver 26 converts the radar return echo E into an original video signal V, which is preprocessed by a video processing unit 27 to eliminate noises and clutters contained therein and to convert the analog original video signal V into a digital video signal D. The radar video capture unit 28 captures a polar formatted video signal PV and a rectangular formatted video signal RV from the digital video signal D. Finally, a display driver 291 with display memory and controller, which can be a VGA card, in the video display unit 29 drives a monitor 292 to visualize the images of the polar formatted video signals PV and the rectangular formatted video signals RV.

The video processing unit 27 comprises an analog processor (AP) 271, a constant false alarm rate (CFAR) control 272, a binary integrator (BI) 273, and a scan to scan integrator (SSI) 274; wherein the AP 271 further comprises a sensitivity time control (STC), a fast time control (FTC), and an analog-to-digital (A/D) converter. When the original video signal V is sent by the receiver 26 to the video processing unit 27, the STC of the AP 271 first filters out sea clutters in the original video signal V. The FTC further filters out rain clutters. The AID converter then converts the original video signal V into a digital video signal D. The CFAR control 272 controls the false alarm rate caused by clutters at a constant. The BI 273 filters out noises in the digital video signal D. Finally, the SSI 274 filters out the sea clutters and rain clutters remained in the digital video signal D.

Figure 6:
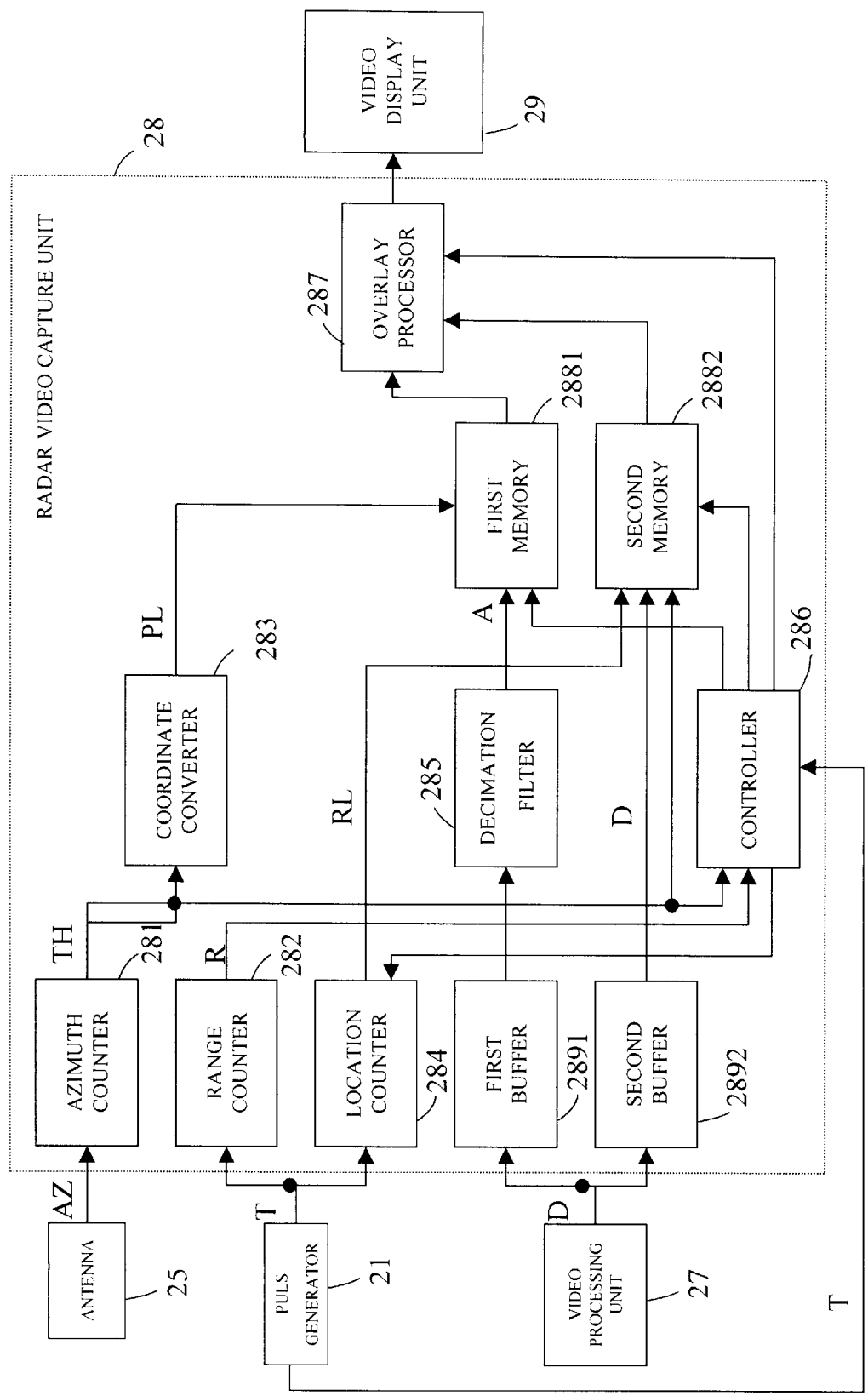
FIG. 6 is a detailed block diagram of the radar video capture unit of the present invention.

Referring to FIG. 6, the radar video capture unit 28 comprises an azimuth counter 281, a range counter 282, a coordinate converter 283, a location counter 284, a decimation filter 285, a controller 286, an overlay processor 287, a first memory 2881, a second memory 2882, a first buffer 2891, and a second buffer 2892. The azimuth counter 281 obtains from the antenna 25 an azimuth synchronization signal (AZ) which contains the azimuthal information of the radar, including an azimuth reference pulse (ARP) and an azimuth change pulse (ACP), where the ACP refers to the azimuthal change while the antenna 25 rotates and the ARP zeros the ACP when the antenna 25 completes one turn and gets back to its original azimuth. When the antenna 25 rotates, there are 4096 ACPs and one ARP in each turn and the ARP appears when the antenna 25 points to the north. By using the azimuth counter 281, AZ is converted into a 12-bit azimuth value TH. The coordinate converter 283 then looks up a table according to the azimuth value TH to obtain the horizontal and vertical components of the polar format and to compute the pixel location PL of each corresponding pixel in the polar format. The range counter 282 measures the range according to the trigger signal T and generates a 16-bit range value R. The controller 286 receives the starting azimuth value THO and the starting range value RO, from user as input parameters. When the TH and R match the input parameters TH0 and R0, the controller 286 enables the location counter 284. The location counter 284 performs display position counting according to the trigger signal T so as to generate the display location RL of each corresponding pixel in the rectangular format.

On the other hand, the multi-channel digital video signal D input from the video processing unit 27 to the radar video capture unit 28 is first stored in the first buffer 2891 and the second buffer 2892 (both of which can be radial buffers) to await subsequent processing by the reduction filter 285 and the second memory 2882, which can be first-in-first-out (FIFO) memory. After obtaining the digital vide signal D from the first buffer 2891, the decimation filter 285 performs decimation processing on the digital video signal D according to the display range scale of the whole area determined by the user so as to obtain the decimated video signal A. This decimated signal A and the pixel location PL are stored together in the first memory 2881, which can be FIFO memory, to await subsequent processing by the overlay processor 287. Simultaneously, The controller 286 drives the second memory 2882 to store the digital video signal D, the azimuth value TH, and the display location RL to await subsequent processing by the overlap processor. The subsequent processing of the overlay processor 287 on the stored data in the first memory 2881 and the second memory 2882 are different. The first memory 2881 takes "the overlay method", which processes 8-bit data each time. The overlap processor 287 first reads in the display location PL and the video signal A stored in the first memory 2881. It then retrieves the display memory of the display driver 291 according to the display location PL. When there is no text or graphics at the display location PL on the display memory, the video signal A is written into the display memory of the display driver 291 through a multimaster bus, which can be a PCI bus or a VMS bus. This step can prevent the original text or graphics on the screen from being overwritten by the video signal A. The second memory 2882 takes the "overwrite method", which processes 32-bit data each time. The overlay processor 287 reads in the starting azimuth value TH, the starting display location RL, and the digital video signal sequence D stored in the second memory 2882. It then overwrites the digital video signal sequence D and the starting azimuth value TH onto the display memory of the display driver 281 according to the display location RL. Since the digital video signal D is stored in the bit-plane form in the display memory, the central processing unit (CPU) of the personal computer (PC) can modify the palette settings of the display memory, selecting to view the signal obtained by the AP 271, the CFAR control 272, the BI 273, or the SSI 274 from the digital video signal D individually, or to view the overlapped images of the above four signals simultaneously. This helps observing the work conditions at each processing stage. The CPU can store long time continuous data in the display memory into the recording media of the PC, such as the hard disk drive (HDD), for the convenience of subsequent signal analysis and diagnosis and correction of algorithms.

Figure 7:
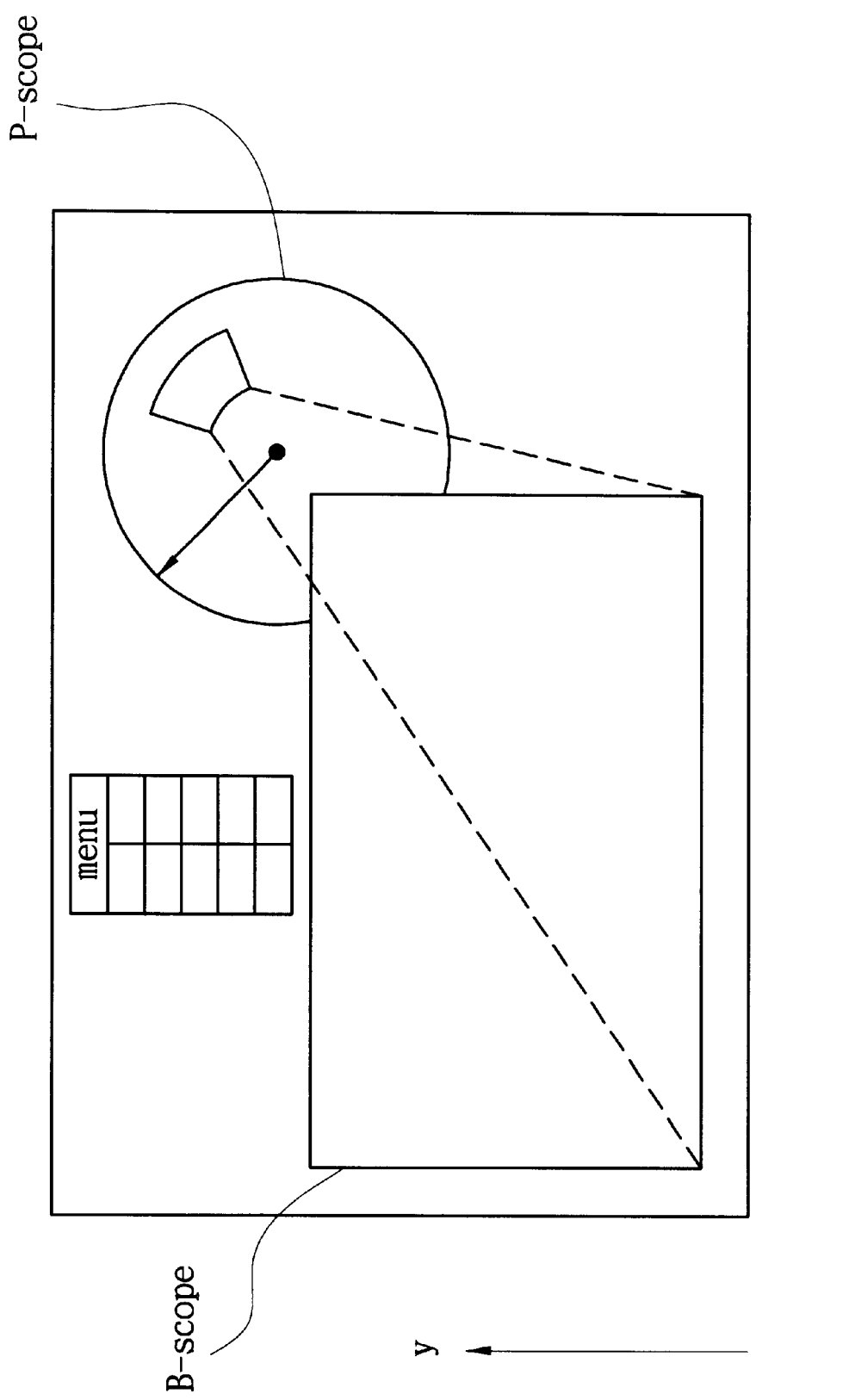
FIG. 7 shows schematically a displayed image of the radar video display and recording device according to the present invention.

Please refer to FIG. 7 for a schematic scope of the present invention. There are two windows on the screen that can simultaneously display the whole area radar video signal and the magnified radar video signal of a specific small area; wherein the whole area video signal is displayed in the polar format and by overlaying with texts or graphics on the screen, whereas the designated area radar video signal is displayed in the rectangular format and by the overwriting method. Therefore, spots adjacent to the transmission direction would not overlap one another and the originality of the video signal can be maintained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

While the present invention has been shown and described with reference to the foregoing preferred embodiments, it is to be understood by those skilled in the art that other changes in form and detail may be made therein without departing from the spirit and scope of the invention as defined in the appended claims.

What is claimed is:

1. A radar video display and recording device that can simultaneously display a plurality of the radar video signals of the whole and designated areas in polar and rectangular (Cartesian) coordinate formats, respectively, and is characterized in that the radar video signals of the designated area are stored into a recording media through the display memory of display driver by a radar video capture unit and personal computer so as to obtain the long-time continuous radar video information of the designated area for subsequent analysis and algorithm verification, the radar video capture unit:

an azimuth counter for obtaining an azimuth synchronization signal from an antenna and counting the azimuth synchronization signal and converting it into an azimuth value;

a range counter for counting the range according to a trigger signal and converting it into a range value;

a coordinate converter for converting the azimuth value into the horizontal and vertical components of the polar coordinates so as to compute the display location of each corresponding pixel in the polar format thereby;

a location counter for generating a display location of each corresponding pixel in the rectangular format;

a decimation filter for performing decimation processing on the digital video signal according to the whole area display range scale determined by the user in order to obtain the whole area video signal;

a controller for controlling the operation of location counter, first memory, second memory and overlay processor; and an overlay processor for performing overlay or overwrite processing for the digital video signal according to the display location.

2. The device according to claim 1 further comprising:

a first memory for storing the display location of the polar coordinates and the decimated video signal; and a second memory for storing the display location of the rectangular coordinates, the azimuth value and the original video signal.

3. The device according to claim 2, wherein the first memory and the second memory are first-in-first-out (FIFO) memory.

4. The device according to claim 1, wherein the azimuth synchronization signal includes an azimuth reference pulse (ARP) and an azimuth change pulse (ACP).

5. The device according to claim 4, wherein the ARP zeros the ACP when the antenna completes one turn of rotation and gets back to the original position.

6. The device according to claim 4, wherein the ACP refers to the azimuthal change while the antenna rotates.

7. The device according to claim 1 further comprising:

a first buffer for storing the digital video signal for the decimation filter to perform decimation processing; and a second buffer for storing the digital video signal before the second memory initializes.

8. The device according to claim 7, wherein the first buffer and the second buffer are radial buffers.

9. The device according to claim 1, wherein the overlay processor is connected to the display driver through a multimaster bus.

10. The device according to claim 9, wherein the multimaster bus is a PCI bus.

11. The device according to claim 9, wherein the multimaster bus is a VME bus.

12. The device according to claim 1, wherein the recording media is a hard disk drive (HDD).

13. The device according to claim 1, wherein the controller compares the azimuth value and range value with the starting azimuth value and the starting range value from user.

14. The device according to claim 1, wherein the radar video capture unit is utilized on a personal computer or workstation platform to simultaneously display multiple channel video signals are stored in the bit-plane form in the display memory, and the CPU of personal computer or workstation can modify the palette setting of the display memory, selecting to view the individual video or to view the overlapped images of the multiple channels simultaneously.

* * * * *

UNITED STATES PATENT AND TRADEMARK OFFICE
CERTIFICATE OF CORRECTION

PATENT NO. : 6,342,852 B1
DATED : January 29, 2002
INVENTOR(S) : Guang-Sheen Liu, Chih-Ming Liao and Hon-Chi Fon It is certified that error appears in the above-identified patent and that said Letters Patent is hereby corrected as shown below:

<u>Title page,</u>
Item [73], please change the Assignee name from "Chang Shan Institute of Science and Technology" to -- Chung Shan Institute of Science Technology --.

Signed and Sealed this

Twenty-seventh Day of August, 2002

*Attest:*

*Attesting Officer*

JAMES E. ROGAN
*Director of the United States Patent and Trademark Office*